106-097.
XR 3563775 EX

United States Patent Office 3,563,775
Patented Feb. 16, 1971

1

3,563,775
8-HYDROXYQUINOLINE AS A SET ACCELERATOR FOR HYDRAULIC CEMENT CONTAINING CALCIUM ALUMINATE
Julie Chi-sun Yang, Somerville, N.J., assignor to Johns-Manville Corporation, New York, N.Y., a corporation of New York
No Drawing. Filed Apr. 1, 1968, Ser. No. 717,969
Int. Cl. C04b 7/32, 13/26, 31/02
U.S. Cl. 106—99                    10 Claims

ABSTRACT OF THE DISCLOSURE 8-hydroxyquinoline as a new and improved hydration accelerating agent for hydraulic setting cement containing calcium aluminate, its use in hydraulic cement containing aluminate and compositions thereof.

BACKGROUND OF THE INVENTION

The relatively slow setting rates of common hydraulic cement containing calcium aluminate such as typical portland cement products on the market is a matter of universal appreciation in the trades and industries utilizing these materials. Moreover, the setting rate of a hydraulic cement is generally significantly hindered when the cement binder is present in admixtures in a relatively small proportion combined with non-cementitious materials such as aggregate, sand and/or asbestos, etc., as is common in concretes and asbestos-cement products and the like.

The chemistry of the hydration and/or setting of hydraulic calcium aluminate containing cements is a highly complex and intricate phenomena, note for example, U.S. Letters Patent No. 2,927,033, and the influences thereon of common additives to modify rates of hydration have been found often to be erratic and unpredictable, particularly in their effect upon the strength properties of the resultant hydrated composition, among other detrimental effects, as noted for example in U.S. Letters Patent No. 2,987,407.

SUMMARY OF THE INVENTION

This invention comprises the discovery and use of a new and improved hydration accelerating agent for hydraulic setting cement containing calcium aluminate, together with the improved products thereof.

It is the primary objective and advantage of this invention to provide an improved accelerating means or agent for typical hydraulic setting cement containing calcium aluminate which effectively and decidedly increase the rate of hydration and early set and in turn early integrity and strength without introducing degrading side effects upon other basic properties of the hydrated cement compositions, thereby minimizing the need for or period of use of molds, supporting frames or structures or other curing facilities.

DESCRIPTION OF THE PREFERRED EMBODIMENT

This invention essentially comprises the discovery of the pronounced advantageous influence of 8-hydroxyquinoline ($C_9H_6NOH$) upon the rate of hydration and/or setting of hydraulic setting cement containing calcium aluminate or cementitious mixtures containing the same, and therefore includes a new application of minim, effective proportions of 8-hydroxyquinoline to hydraulic cement containing calcium aluminate and the novel cementitious compositions of the combination therewith, together with attendant benefits in increasing early setting and strength resulting therefrom.

2

Quickening the early set or hydration of comomn hydraulic cement containing calcium aluminate, without incurring degrading influences, is achieved through the inclusion within the cementitious material and admixtures containing the same, of only about 0.02% of 8-hydroxyquinoline based upon the weight of the total solids content of the cement material or admixture, which amount is approximately the minimum to be effective to a practical degree in typical mortars, concretes, asbestos-cement and the like compositions. Effective and expeditious amounts range therefrom up to about 0.5%, but preferably only about 0.1% of 8-hydroxyquinoline is normally adequate commensurate with derived benefits and to minimize the possibility of adulteration or deleterious results as is often the consequence of additives. To facilitate effective distribution of such minimum proportions of additive to the total mass and therefore maximum uniformity as well as promptness of its influence therein, it is highly desirable that the 8-hydroxyquinoline be dispersed in the form of a dilute aqueous solution, for example concentrations of about 0.01 to about 1.0%, or typically approximately 0.1% for addition to the cementitious material. Alternatively the 8-hydroxyquinoline can be premixed in with the mixing water used for the preparation of the wet cement mixture which provides an equally effective and possibly more convenient procedure. Thus, it is apparent that the accelerating agent of this invention can be introduced prior to mixing the wet cement material for use, or subsequent thereto if followed by sufficient additional mixing for good dispersal.

The rate of initial hydration and/or setting, and in turn development of integrity and strength, being most conveniently and demonstratively evidenced and determined by the resistance of a shaped mass of hydraulic cementitious material to deformation from its originally imparted dimensions or shape, an evaluation comprising a means of measuring the relative degree or extent of sag in a recently hydrated standardized body aptly suspended has been perfected and adopted in some industries dealing with hydraulic cementitious products. This test, referred to hereinafter as the "sag cake test" and comprising a controllable and reproduceable means of evaluation and obtaining significant physical data and relative results was utilized in the appraisal of the instant invention in comparing the effects thereof with that of a like standard without the means of the invention under identical conditions. This test was applied to the examples of this invention pursuant to the following procedure.

Sag cake test procedure

The basic steps of this test are put into effect or carried out according to a predetermined time schedule as given, and an appropriate timing mechanism is employed in connection therewith. Initially, a dry, thoroughly mixed (10 minute agitation) 150 gm. sample of stock of the particular asbestos-cement formulation to be evaluated is prepared for each cake test, and added to 1000 milliliters of distilled water with the mixing thereof commencing immediately at 0:00 minutes. After mixing 1:00 minute, the wet admixture of stock is promptly transferred to a vacuum filter box measuring 3 in. x 8 in. and having a bottom perforated plate of like dimensions covered with filter paper, and at 1:15 minutes a vacuum is applied to the filter box. The vacuum should be such as to register 16 in. of mercury during removal of water and between 13 and 13.5 in. of mercury thereafter throughout the remainder of the filtering operation which continues for a duration of 3 minutes and 45 seconds. Upon withdrawal of the excess water a 25 lb. hand tamp is placed on the top of the cake for 10 seconds to smooth its upper surface, and at 5:00 minutes the vacuum is removed. In the 5:00 to 6:00 minute interval the cake is removed from the filter box and in the 6:00 to 6:30 minute interval the cake is weighed. From 6:30 to 7:05 minutes the cake is placed in a press and then consolidated at a pressure of 320 p.s.i. applied across the entire 3 in. x 8 in. cake surface over 10 seconds at a uniform rate of loading using 3 to 4 strokes to reach maximum load. The application of pressure should start at about 6:50 minutes with maximum load being reached at 7:00 minutes and maintained until 7:05 minutes. From 7:05 to 9:00 minutes the pressed cake is again weighed and then set up for the sag test.

Next, the cake is prepared for measuring its sag or deviation from horizontal under a given load by placing the 3 in. x 8 in. cake across anvils positioned at each end of a base sheet providing an intermediate 6 in. free span and with a releasable center support to hold the test cake horizontally across the span between the anvils before the test is started. A foot or base of a gauge micrometer with an added dead weight of 140.0 gms. is mounted centrally between the anvils and positioned on the upper surface of the test cake. The micrometer reading is taken to determine the location of the surface of the cake as a basis for the subsequent sag measurement. At 9:00 minutes the center support between the anvil holding the intermediate section of the cake is released and a reading on the micrometer taken at 10:00 minutes. This reading is subtracted from the initial reading giving the sag or deviation from the horizontal due to the combined weight of the cake itself and the load applied from the micrometer assembly.

Upon completion of the sag measurement, the cake is removed from the tester and carefully straightened on a flat plate and placed for 24 hours in a moisture cabinet held at 90±3° F. and at least 90% relative humidity. This is followed by 16 hours in an autoclave at 100 p.s.i. saturated steam (337.8° F.). After the curing cycle the cake is cooled to room temperature and submerged for 24 hours in fresh water at 73±3° F., removed and the saturated cake weight determined in both air and water. Then the flexural strength of the cake is determined in accordance with ASTM Specification C–223–55 on a suitable testing device having a test span of 6 in. and the breaking load recorded. Last, the broken cake is placed in a ventilated oven at 212 to 220° F. and dried for 48 hours, cooled in a desiccator and the dry weight determined for use in water absorption and density calculation.

The above standard test was utilized in ascertaining the accelerating influence of 8-hydroxyquinoline upon a typical cementitious material comprising a high proportion of nonhydrating material by measuring the sag of identical compositions both with and without this accelerator under the same conditions in all other respects which constitutes a direct comparison of the extent of the development of the integrity and strength of the early stages of hydration setting or cure, as well as establishing the absence of induced degrading effects upon the strength of the completely cured product. In these tests the composition of all samples consisted of 20 parts by weight of asbestos fiber, 30 parts by weight of sand and 50 parts by weight of ordinary portland cement (National brand). Four independent asbestos-cement samples were prepared and run to provide a standard, and four identical asbestos cement composition samples with the addition of 0.10% of 8-hydroxyquinoline, based upon the weight of the total solids of the samples, added thereto by dispersing the same in the 1000 ml. of mix water were subjected to identical test conditions to ascertain the effects of this agent. The average of each set of four samples for the data derived from the specified determination is set forth in the following Table I:

TABLE I
[Acceleration of early set due to 8-hydroxyquinoline]

| | Thickness, inch | Dry density, p.c.f. | Break load, lb. | Modulus of rupture, p.s.i. | | | | Sag, inch | Change in sag, percent |
| --- | --- | --- | --- | --- | --- | --- | --- | --- | --- |
| | | | | Minimum | Maximum | Average | Standard deviation | | |
| Control, no addition | 0.276 | 89.7 | 111.0 | 3,780 | 4,600 | 4,210 | 393 | 0.133 | |
| 0.20% 8-hydroxyquinoline | 0.275 | 89.4 | 111.4 | 4,020 | 4,510 | 4,270 | 201 | 0.058 | −56 |

As is evident from the foregoing data, within the brief period of about 10 minutes from the time of the admixing of the cement composition with the water for hydration, the inclusion therewith of the 8-hydroxyquinoline reduced sag of the body over 50% and as such produced an accelerated early set of significantly greater strength and integrity which in applications in actual production or construction would markedly reduce the period required for supporting forms or structures, or even eliminate them entirely in some applications, as well as shorten the waiting period for routine use of products or structures formed with the cement compositions of this invention.

Further evaluations of 8-hydroquinoline, and comparisons, are given in the following Table II wherein the relative sag, as determined by the above described sag cake test procedure, and change in flexural strength, also determined as above, for the identified agents and their proportions based upon the total weight of the solids of the cementitious mixture, under like conditions were determined with a standard asbestos-cement composition of, in percent by weight, 20% asbestos fiber, 30% sand, and 50% portland cement, to demonstrate the accelerating influence of each and effects upon strength.

TABLE II

| Additive | Weight percent added | Percent change in sag | Percent change in flexural strength |
| --- | --- | --- | --- |
| Aluminon ($C_{22}H_{23}N_3O_9$) | 0.10 | 0 | −5.0 |
| Ferron (7-iodo-8-hydroxy-quinoline-5-sulfonic acid) | 0.10 | +27 | −5.1 |
| EDTA (Ethylenediamine-tetra-acetic acid) | 0.02–0.04 | +2.1 to +2.2 / +2.1 to +8.4 | −1.0 to +2.8 / −1.0 to −2.1 |
| 8-hydroxyquinoline | 0.02 | −65.2 | +3.4 |
| | 0.05 | −66.1 | +0.7 |
| | 0.10 | −65.2 | +2.6 |
| | 0.20 | −48.9 | +0.5 |

The means of this invention are applicable to all forms of hydraulic cement materials containing calcium aluminate or mixtures containing a hydraulic cement containing calcium aluminate as the binder matrix including, for example, mortars, concrete or cement materials containing sand or aggregate, asbestos cement products, etc., and is especially applicable to admixtures such as concrete, etc., which contain high proportions of more or less inert filler materials such as sand or aggregate and as such are somewhat slower in setting. Hydraulic cement containing calcium aluminate include natural cement materials formed by calcining naturally occurring mixtures of calcareous and aluminate containing argillaceous substances, the portland cements, alumina cements, formed by heating a mixture of limestone and bauxite, and similar hydraulic active cementitious materials containing significant proportions of lime or lime available components and aluminates.

It will be understood that the foregoing details are given for the purpose of illustration, not restriction, and the variations within the spirit of this invention are intended to be included within the scope of the appended claims.

What I claim is:
1. Method of accelerating the setting of hydraulic cement containing calcium aluminate comprising adding to the cement material an effective amount of at least about 0.02% of 8-hydroxyquinoline based upon the weight of the total solids content of the cement mixture.
2. The method of claim 1 wherein the amount of 8-hydroxyquinoline added to the cement material is approximately 0.02% up to approximately 0.5% based upon the weight of the total solids content of the cement material.
3. The method of claim 2 wherein the 8-hydroxyquinoline is added in a dilute aqueous solution.
4. The method of claim 3 wherein the cement material comprises an asbestos-portland cement admixture.
5. The method of claim 4 wherein a dilute aqueous solution in concentration of about 0.01 to about 1.0% of 8-hydroxyquinoline in amount of approximately 0.02% to approximately 0.1% is added to an asbestos-portland cement and sand admixture, based upon the weight of the total solids content of the cement material.
6. A new composition of matter comprising hydraulic cement containing calcium aluminate combined with 8-hydroxyquinoline in an amount of at least about 0.02% based upon the weight of the total solids content of the cement material, said amount being effective to accelerate the setting of said composition.
7. A new composition of matter of claim 6 wherein the 8-hydroxyquinoline is present in amount of approximately 0.02% to approximately 0.5% based upon the weight of the total solids content of the cement material.
8. The new composition of matter of claim 7 wherein the hydraulic cement comprises aggregate.
9. The new composition of matter of claim 7 wherein the hydraulic cement comprises asbestos.
10. The new composition of matter of claim 7 wherein the 8-hydroxyquinoline is present in amount of approximately 0.02% to approximately 0.1% based upon the weight of the total solids content of the cement material and the hydraulic calcareous cement comprises asbestos-portland cement and sand.

References Cited

UNITED STATES PATENTS

| | | | |
|---|---|---|---|
| 3,269,888 | 8/1966 | Yang | 106—99 |
| 2,987,407 | 6/1961 | Ulfstedt et al. | 106—103 |
| 2,927,033 | 3/1960 | Benedict et al. | 106—90 |
| 2,553,618 | 5/1951 | Willson | 106—90 |

OTHER REFERENCES

Lea and Desch, "The Chemistry of Cement and Concrete," Edw. Arnold & Sons, pp. 151 and 153 (1956).

TOBIAS E. LEVOW, Primary Examiner

W. T. SCOTT, Assistant Examiner

U.S. Cl. X.R.

106—90, 97, 104, 314, 315